S. S. WATSON.
HOSE COUPLING.
APPLICATION FILED AUG. 22, 1910.
1,019,000.
Patented Feb. 27, 1912.
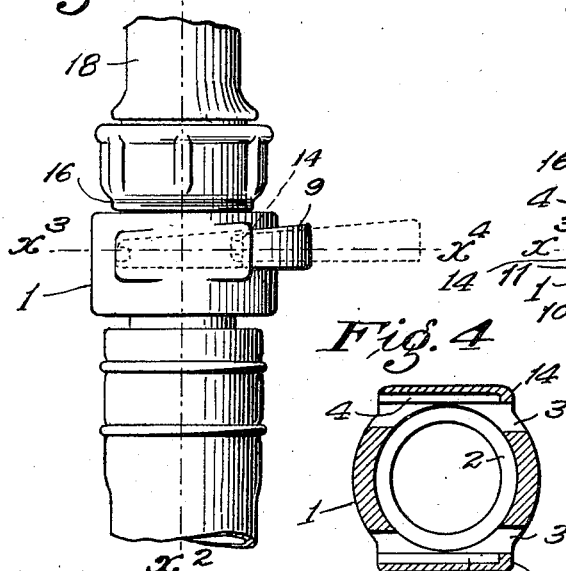
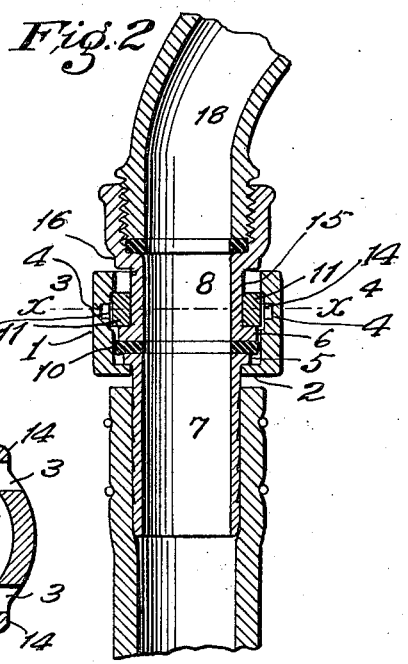
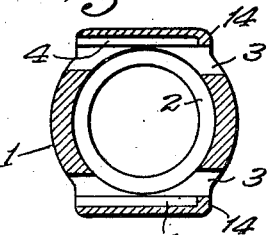
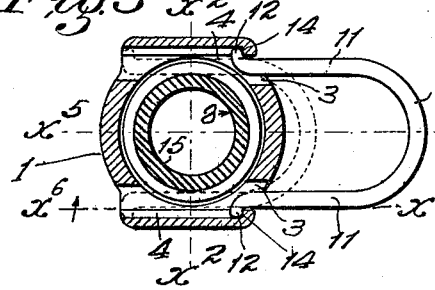
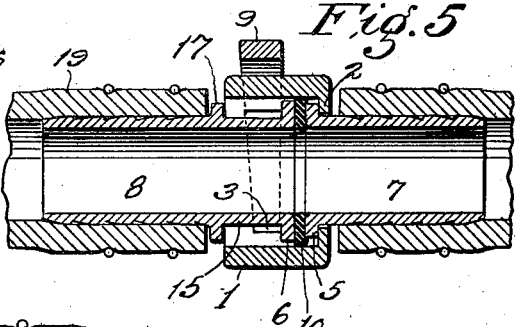
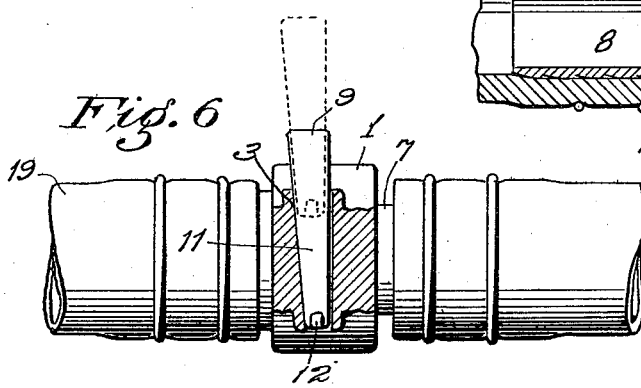
Witnesses
C. C. Holly
Olive Diffenderfer
Inventor
Samuel S. Watson
James R. Townsend
his atty.

UNITED STATES PATENT OFFICE.

SAMUEL SHERMAN WATSON, OF COLEGROVE, CALIFORNIA, ASSIGNOR, BY DIRECT AND MESNE ASSIGNMENTS, TO CHARLES F. SCHWICKERT, OF LOS ANGELES, CALIFORNIA.

HOSE-COUPLING.

1,019,000.    Specification of Letters Patent.    Patented Feb. 27, 1912.

Application filed August 22, 1910. Serial No. 578,434.

*To all whom it may concern:*

Be it known that I, SAMUEL SHERMAN WATSON, a citizen of the United States, residing at Colegrove, in the county of Los Angeles and State of California, have invented a new and useful Hose-Coupling, of which the following is a specification.

An object of this invention is to provide a simple hose coupling that can be coupled and uncoupled with great convenience, facility, ease and speed without twisting or damaging the hose, thereby making the life of the hose very much longer.

The coupling may be made in different forms for coupling two hose sections together and for coupling a hose section to a hose bib.

The accompanying drawings illustrate the invention in two of the forms in which it may be embodied.

Figure 1 is a side elevation of the hose coupling in use connecting together a hose and hose bib, fragments of which are shown. Fig. 2 is a section of the same on line $x^2$, Figs. 1 and 3. Fig. 3 is a cross section on line $x^3$—$x^4$, Figs. 1 and 2. Fig. 4 is a section of the coupling sleeve on line $x^3$—$x^4$, Figs. 1 and 2, omitting the forked wedge. Fig. 5 is a section on line indicated by line $x^5$, Fig. 3, of a coupling adapted to connect two sections of hose, fragments of which are shown. Fig. 6 is a side elevation of the form of coupling shown in Fig. 5, part of the coupling sleeve being sectioned to expose the side of the forked wedge which is shown intact.

The coupling sleeve 1 is provided at one end of its chamber with a coupling nipple retainer 2 in the form of an internal flange and is also provided on opposite sides with wedge-receiving ways 3 and slotted extensions 4 thereof, said ways being spaced apart from the retainer 2 to accommodate the flanges 5 and 6 of the coupling members, as the nipples 7 and 8 so that the forked wedge 9 sliding in the ways 3 may engage one of the flanges to force both flanges toward, and to clamp them together against, the retainer 2. Usually a washer 10 is interposed between the flanges 5 and 6 to make the joint between the nipples 7 and 8 tight. The two limbs 11 of the fork 9 are wedge-shaped, the wedges being provided at their ends with outwardly extending tips 12 turned laterally from the respective edges of the key to run in the slots 4 that are provided with stops 14 to prevent withdrawal of the tips from said slots. The outer and inner faces of the limbs 11 are preferably parallel with each other and the ways 3 are sufficiently broad to allow the tips of the fork to be pressed inward to pass the stops 14 when it is desired to insert or withdraw the wedge from the sleeve.

When the fork is in normal form its tips are extended to slide freely along the slots 4 inside the tips 14; and to assemble the parts, the ends of the fork will be pressed toward each other and will then be inserted into the ways 3 and will then be allowed to spread apart. The stops 14 are oppositely arranged at one side of the sleeve as seen in Figs. 3 and 4 to allow the forks to be entirely withdrawn from the chamber of the sleeves so that the flanges 5, 6, and the washer 10 may be inserted; whereupon the wedge will be forced home into the position shown in solid lines in Figs. 1, 2, 5 and 6 and in dotted lines in Fig. 3; whereupon the coupling is effected. This may be readily done with the fingers of one hand so as to compress the washer 10 tightly and to close the joint. To uncouple the hose the bow at 9 between the forks of the wedge affords a handle by which the wedge may be withdrawn.

The forms of coupling nipples that are employed are various, but preferably the nipple which extends past the wedge within the sleeve is provided with a neck 15 to accommodate the wedge 9 and with a shoulder 16 or way 17, to serve as a stop or guard to hold the bib 18 or the hose section 19 out of the sleeve.

I claim:—

1. A hose coupling comprising a sleeve having an inwardly projecting retainer and transverse ways, flanged coupling members in the sleeve and a forked wedge in the ways to force the flanges toward the retainer; the limbs of said wedge having outwardly projecting tips which are turned laterally from the respective edges of the key and said sleeve having slots to accommodate said tips and also having stops at the ends of the slots to retain said tips.

2. A hose coupling comprising a sleeve having an inwardly projecting retainer and transverse ways, flanged coupling members in the sleeve and a resilient forked wedge in the ways to force the flanges toward the retainer; the limbs of said wedge having outwardly projecting tips which are turned laterally from the respective edges of the key and said sleeve having slots to accommodate said tips and also having stops at the ends of the slots to retain said tips.

3. A hose coupling comprising a sleeve having an inwardly projecting retainer and transverse ways, flanged coupling members in the sleeve and a forked wedge in the ways to force the flanges toward the retainer; the limbs of said wedge having outwardly projecting tips which are turned laterally from the respective edges of the key and said sleeve having slots to accommodate said tips and also having stops at the ends of the slots to retain said tips; one of said flanged coupling members being provided with a neck to accommodate the limbs of the wedge.

4. A hose coupling comprising a sleeve having an inwardly projecting retainer and transverse ways, flanged coupling members in the sleeve and a forked wedge in the ways to force the flanges toward the retainer; the limbs of said wedge having outwardly projecting tips and said sleeve having slots to accommodate said tips and also having stops at the ends of the slots to retain said tips; one of said flanged coupling members being provided with a neck to accommodate the limbs of the wedge, and with a shoulder to form a stop for the purpose set forth.

In testimony whereof, I have hereunto set my hand at Los Angeles, California, this 17th day of August, 1910.

SAMUEL SHERMAN WATSON.

In presence of—
JAMES R. TOWNSEND,
OLIVE DIFFENDERFER.

---

Copies of this patent may be obtained for five cents each, by addressing the "Commissioner of Patents, Washington, D. C."